Figures 4, 4A:
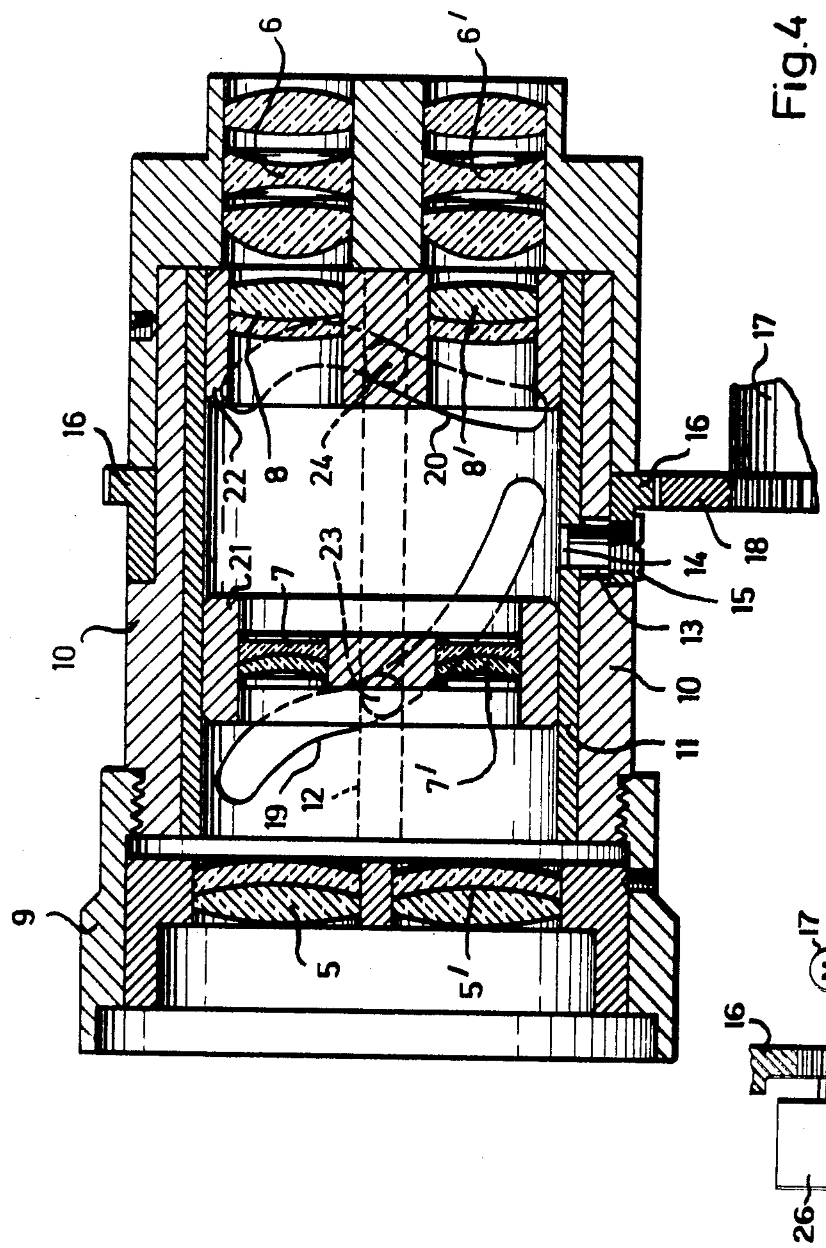

OR 3,840,291

United States Patent [19]

Littmann et al.

[11] 3,840,291

[45] Oct. 8, 1974

[54] PANCRATIC MAGNIFICATION CHANGER

[75] Inventors: Hans Littmann, Heidenheim; Wolfgang Pfeiffer, Wasseralfingen, both of Germany

[73] Assignee: Carl Zeiss-Stiftung, (Brenz) Wuerttemberg, Germany

[22] Filed: Oct. 31, 1972

[21] Appl. No.: 302,572

[30] Foreign Application Priority Data

Nov. 5, 1971 Germany .......................... 2154977

[52] U.S. Cl. .................................. 350/187, 350/36

[51] Int. Cl. .......................................... G02b 7/06

[58] Field of Search .................... 350/184, 186, 187

[56] References Cited

UNITED STATES PATENTS

| | | | |
|---|---|---|---|
| 3,004,471 | 10/1961 | Cook | 350/187 |
| 3,057,259 | 10/1962 | Schuma | 350/187 X |
| 3,191,496 | 6/1965 | Cook | 350/186 |
| 3,567,317 | 3/1971 | Plummer | 350/187 X |

*Primary Examiner*—John K. Corbin
*Attorney, Agent, or Firm*—Hill, Gross, Simpson, Van Santen, Steadman, Chiara & Simpson

[57] ABSTRACT

A pancratic magnification changer, particularly for operation and routine microscopes in which the actuating members for the magnification changer are so controlled that the speed of change of the magnification is a desired nonlinear function of the magnification.

2 Claims, 5 Drawing Figures

Fig.1
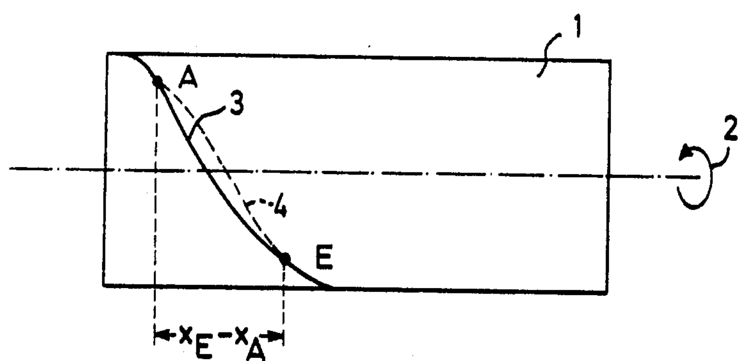
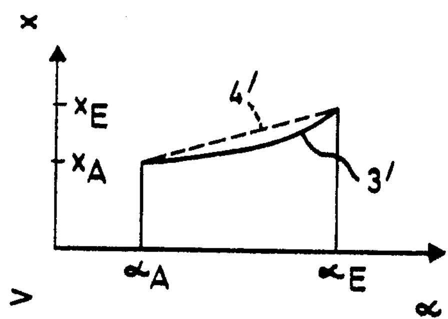
Fig. 2
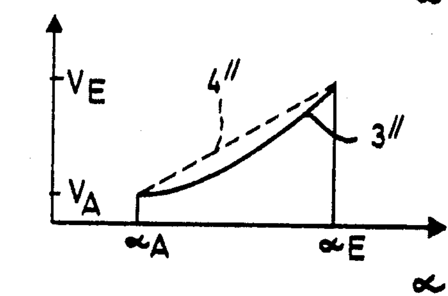
Fig. 3

PANCRATIC MAGNIFICATION CHANGER

In the case of operation microscopes, corneal microscopes and other steroscopic and non-stereoscopic microscopes, it is frequently desired to alter the magnification without exchanging optical parts and/or having to focus subsequently. It is known to insert for the purpose magnification changers which consist for example of reversible Galilean telescope systems. In this connection, there results a stepwise change of magnification. In the case of such microscopes, also continuous magnification changers are utilized, so-called pancratic optical systems, in which one or several optical partial systems are so carried out that a constantly sharp or sharp-appearing image of the continually changeable magnification of the object results.

If an object approaches an observer with constant speed, its angular size does not increase uniformly but with acceleration. An observer is accordingly accustomed to interpret an accelerated increase of the observed angular size as indicating a constant speed of approach of the object. If a pancratic optical system is constructed in the usual manner, so that the microscope magnification and with it the angular size of the image increases uniformly, that is with constant change of speed, the observer has the impression that the depicted object approaches with decreasing speed or the magnification increases with decreasing speed, respectively. If such a known pancratic system is utilized as a magnification changer in an operation microscope or routine microscope, there results upon increasing magnification for the observer the disconcerting impression of lacking precision as well as the deceptive impression that it is difficult to undertake a fine adjustment of a predetermined magnification. Far more unpleasant is in the case of such a system for the observer the impression which results upon decreasing magnification. As the magnification decreases uniformly, the observer has the impression that the depicted object becomes more remote with increasing speed, that is, the object observed seems suddenly to disappear.

This is particularly disconcerting with operation microscopes. Here a decreasing magnification gives the operating physician the lively impression of having to guide the instruments with increasing speed to the field of operation seemingly rapidly disappearing. Thus, the danger exists that the instruments impinge on the field of operation, which is actually still stationary, so that injuries could occur.

It is the object of the present invention to prevent with a pancratic magnification changer the disadvantages described, so that particularly also with operation and routine microscopes the observer is not confused by increasing or decreasing magnification of the image offered him.

The invention relates to a pancratic magnification changer, particularly for operation and routine microscopes. It is distinguished thereby that the actuating members for the magnification changer are so controlled that the change in speed of the enlargement is a nonlinear function of the magnification. For the prevention of the disadvantages set forth of known magnification changers, it is particularly of advantage to provide such a control of the actuating members that the speed of the change of the magnification increases with increasing magnification and becomes less with decreasing magnification. Thereby it is attained that for the observer the impression always results of a magnification changing with constant speed.

As actuating member for a pancratic optical system, normally a guide cylinder is used. This guide cylinder has guide surfaces which ordinarily are carried out as helicoidal surfaces and which serve the purpose of guiding the slidable optical partial systems of the pancratic system. In this connection, a constant angular speed of the guide cylinder corresponds in general to a constant speed of the change of magnification.

It is of advantage also with the new pancratic magnification changer to provide a guide cylinder with control surfaces, whereby the rotation of the guide cylinder takes place with constant angular speed and the control surfaces have a form deviating from a helicoidal surface. These control surfaces are accordingly so constructed that the change of speed of the magnification increases with increasing magnification and becomes smaller with decreasing magnification.

It may also be suitable to provide as actuating member for the pancratic magnification changer a guide cylinder whose speed of rotation is a nonlinear function of the magnification. This is, for example, attained thereby that between the motor serving for the drive of the guide cylinder, a gear assembly is arranged with variable speed ratio. For the construction, various means known per se may be utilized, for example cam discs, V-belt drives of variable speed ratio and gear units with elliptical gear wheels.

It may also be of advantage to provide for the drive of the guide cylinder a motor with variable rate of rotation. There is utilized for this purpose, for example, an electromotor controllable by change of resistance and it is so controlled that its rate of rotation increases with the magnification of the optical system. For this purpose, one may for example fasten to the drive shaft of the optical system a cam disc which operates the take-off from a variable resistance.

A preferred embodiment of the invention will be described in greater detail in the following on the basis of FIGS. 1 to 4 of the appended drawings.

IN THE DRAWINGS:

FIG. 1 shows a guide cylinder for the actuation of the pancratic magnification changer, which has a guide surface deviating from a helicoidal surface, FIG. 2 shows a shifting of an optical partial system of the pancratic magnification changer in dependence upon the angle of rotation of the guide cylinder, FIG. 3 shows the dependence of the magnification of the pancratic magnification changer on the angle of rotation of the guide cylinder, and FIG. 4 shows an embodiment by way of example of a pancratic magnification changer in section.

FIG. 4A illustrates how the constant speed motor may be connected to a variable speed ratio gear assembly.

In the embodiment by way of example of FIGS. 1 to 3, it is assumed that the pancratic magnification changer contains an optical partial system which must be moved for the change of the magnification. A guide cylinder 1 serves for the movement of this partial system, said guide cylinder being rotated in direction of the arrow 2 in order to attain an increasing magnification of the optical system. The guide cylinder 1 has a guide surface 3 which serves for guidance of the optical partial system not shown here. This guide surface 3 deviates from the form of a helicoidal surface, which is indicated in dotted lines in FIG. 1 and designated with reference character 4. The guide member for the optical partial system moves upon a rotation of the guide cylinder between the points A and E. As shown in FIG. 2, the movement of the optical partial system takes place not linearly with the angle of rotation $\alpha$, but the shifting takes place according to the curve 3'. FIG. 3 shows that upon a rotation of the guide cylinder 1 between the two limit values $\alpha_A$ and $\alpha_E$, the magnification increases according to the curve 3'' while it would increase linearly according to the curve 4'', if instead of the guide surface 3, the guide surface 4 carried out as helicoidal surface were provided. As is apparent from FIG. 3, the speed of change of the magnification increases with increasing magnification, while it becomes less with the decreasing magnification. Thereby it is attained that for the observer the impression results of a magnification changing with constant speed, if the guide cylinder is rotated between the two limit values.

FIG. 4 shows a pancratic magnification changer in stereo-embodiment. This magnification changer contains four optical partial systems, of which 5 and 5' as well as 6 and 6' are stationary receiving optical members, while 7 and 7' each show a dispersing member 8, 8' each a receiving member, which must be shifted in axial direction for the change of the focal length of the pancratic system, that is, accordingly for the change of magnification in axial direction.

With the reference character 9 is designated an annular mounting which receives the stationary groups of lenses 5, 5' and is threadedly connected with a tubular part 10. There is arranged coaxially with this part a cylindrical, tubular structural part 11 movable rotatively in the same. In the internal surface of the part 10 is cut a guide path or groove 12 open toward the inside and extending in longitudinal direction, which extends in a straight line. In the wall of the tubular part 10 is cut a slot 13 which extends in circumferential direction over an angle of approximately 160°. Through this slot an actuator pin 15 engages, which is fixed in the bore 14 of the structural part 11. With the actuator pin 15 is fixedly connected a gear ring 16, which is in engagement with a gear ring 18 driven by the motor 17. Through actuation of the motor 17, the cylindrical structural part 11 is accordingly rotated about its axis, and indeed within the limits determined by the slot 13.

The structural part 11 acts here as guide cylinder, comparable with the guide cylinder 1 in FIG. 1. The structural part 11 contains two guide slots 19 and 20, which serve for the control of the movement of the partial systems 7, 7' or 8, 8', respectively.

The partial systems 7, 7' are arranged in a mounting 21 which is slidingly movable within the structural part 11. The same holds true for the mounting 22 of the partial systems 8, 8'. The mounting 21 of the partial systems 7, 7' is provided with a radially extending pin 23 which through the guide slot 19 in the structural part 11 engages in the groove 12 in the structural part 10.

Upon an actuation of the motor 17, the structural part 11 is accordingly rotated, and thereby the mounting 21 of the partial systems 7, 7' is shifted in axial direction in a manner determined by the guide slot 19. In the embodiment shown here by way of example, the motor 17 rotates with constant angular speed and the guide slot 19 is so constructed, that the speed of change of the magnification increases with increasing magnification and becomes less with decreasing magnification.

During the rotation of the structural part 11, the partial systems 7, 7' carry out a movement in axial direction, which brings about a change in the focal length, that is, a change in the magnification of the system. At the same time, the partial systems 8, 8' are moved through the guide slot 20 and the pin 24 fixed on the mounting 22 and engaging through the guide slot 20 in the slot 12, and carry out thereby a reciprocating equalization movement. The two guide slots 19 and 20 are so dimensioned with respect to one another, that the position of the image planes remains maintained upon each adjusted magnification.

It is possible to modify the embodiment shown by way of example in FIG. 4 so that the motor 17 is driven with a variable rate of rotation. In this case, the guide slots 19 and 20 are provided with a different shape. The same holds true also if the motor 17 is driven with constant speed and a variable speed ratio device is included between this motor and the ring gear 16. FIG. 4A shows a state of the art variable speed ratio gear assembly 26 connected with ring gear 16 via gear 27 and to constant speed motor 17.

The basic idea of the invention to attain through suitable construction of the guide cams or the gear unit, respectively, or through regulation of the rate of revolution of the motor, a desired progress of the speed of change of the magnification, is naturally not limited to the embodiments shown or indicated here by way of example, but it is for example also utilizable in the photo, film, television and telescope technique.

What we claim is:

1. A pancratic magnification changer comprising a supporting framework, optical means in said framework, actuating means operatively connected with said optical means for altering the inter-relation of the same in said framework to thereby change the magnification, a drive motor for said actuating means and control means acting on said actuating means to cause the rate of change of the magnification to increase in excess of a linear rate with increasing magnification and to decrease at less than a linear rate with decreasing magnification, whereby the observer receives the impression that the magnification is changing with constant speed throughout the magnification range.

2. A pancratic magnification changer according to claim 1 in which said actuating means includes a guide cylinder having guide surfaces thereon, means for rotating said drive motor with constant angular velocity, and transmission means having a variable transmission ratio interconnecting said drive motor and said guide cylinder.

* * * * *